UNITED STATES PATENT OFFICE.

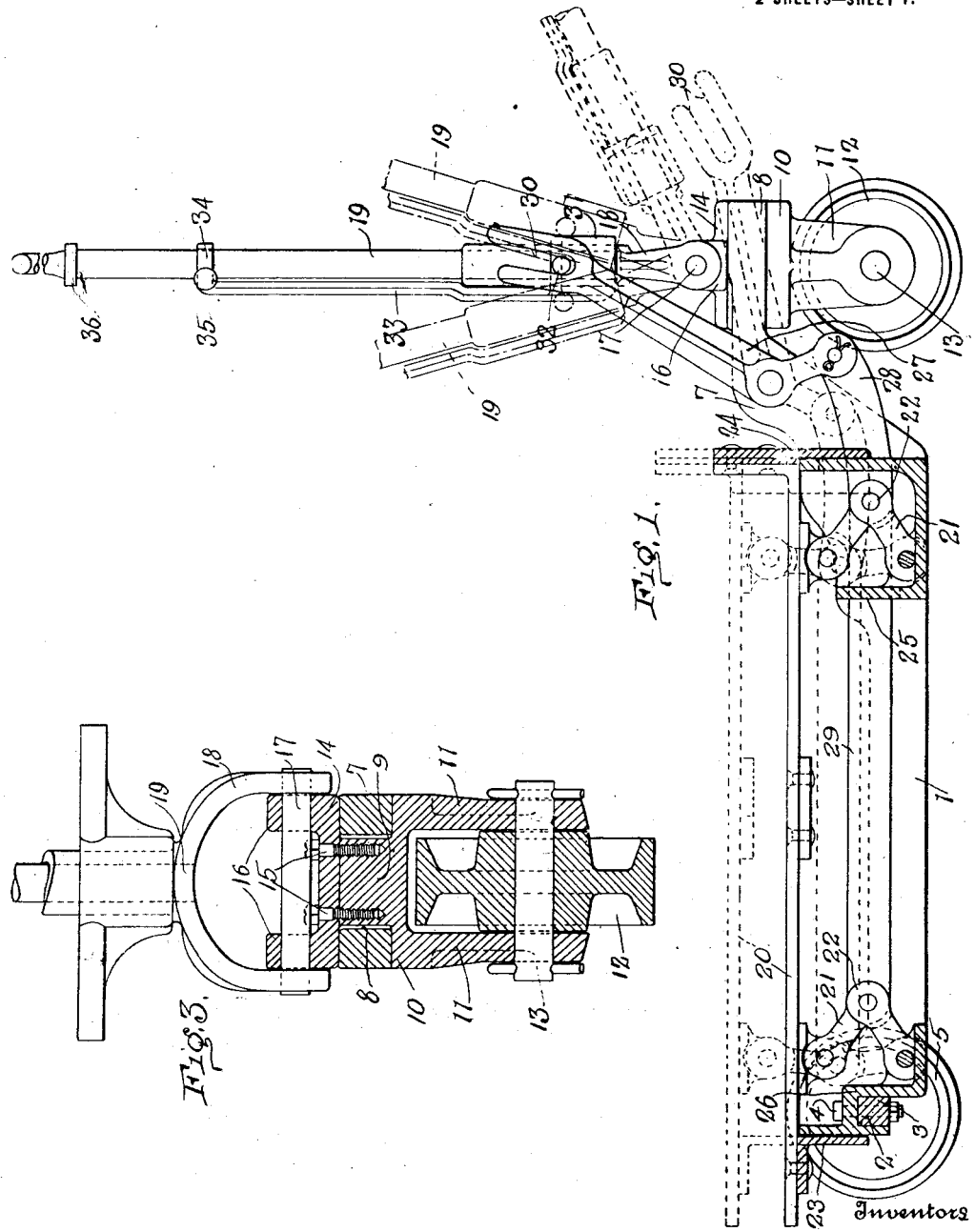

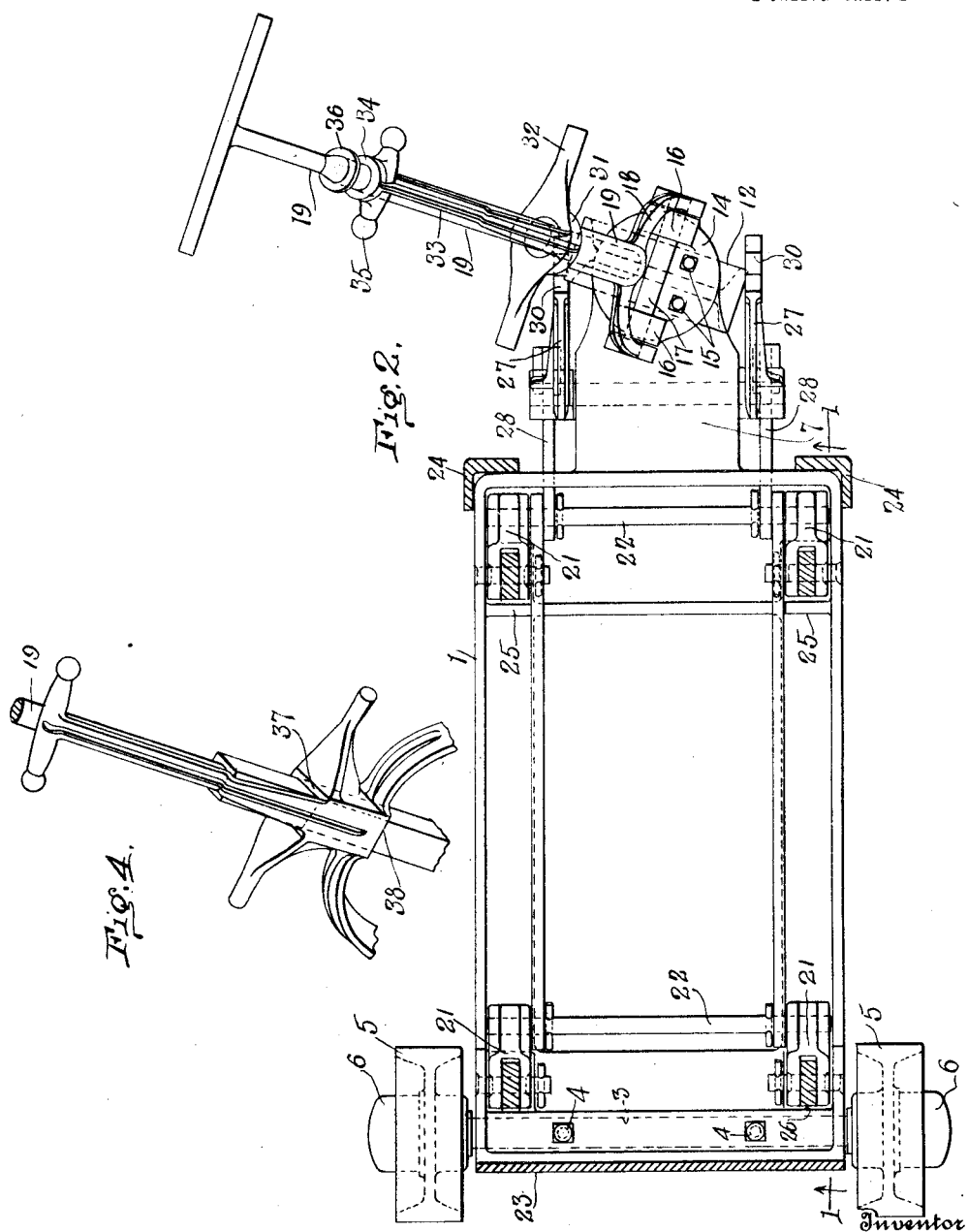

SHERWOOD M. CHASE AND FRANK A. FLEMING, OF COLUMBUS, OHIO, ASSIGNORS TO THE CHASE FOUNDRY AND MANUFACTURING CO., OF COLUMBUS, OHIO, A CORPORATION OF OHIO.

TRUCK.

1,182,249.     Specification of Letters Patent.     Patented May 9, 1916.

Application filed March 8, 1915. Serial No. 12,732.

*To all whom it may concern:*

Be it known that we, SHERWOOD M. CHASE and FRANK A. FLEMING, citizens of the United States, residing at Columbus, in the county of Franklin and State of Ohio, have invented certain new and useful Improvements in Trucks, of which the following is a specification, reference being had therein to the accompanying drawing.

This invention relates to trucks and more particularly to trucks of that type in which the load-supporting platform is elevated to lift the load after the truck has been placed beneath the same.

The object of the invention is to provide a truck of this kind by which the load will be raised in a substantially vertical line.

A further object of the invention is to provide an actuating device, for elevating the platform relatively to the base of the truck, which will be manipulated by the handle or tongue of the truck, the handle having mounted thereon an operable device to connect the same with and disconnect the same from said actuating device.

It is also an object of the invention to provide toggle joints for elevating the platform and to so connect the toggle joints as to cause uniformity of movement.

A further object of the invention is to provide a truck of this kind which will be very simple and very strong in its construction and which will be of such a character that it can be easily operated and that the truck can be steered, to move it into position, under practically all conditions.

In the accompanying drawings, Figure 1 is a side elevation, partly in section, of a truck embodying our invention; Fig. 2 is a top, plan view of a truck embodying the invention, showing the steering handle laterally displaced; Fig. 3 is a sectional, detail view of the steering head; and Fig. 4 is a detail view of a slightly modified form of handle embodying the invention.

In these drawings we have illustrated the invention as applied to a three wheeled truck comprising a base 1 in the form of a rectangular frame having at its rear end a transverse recess or socket 2 angular in cross section and adapted to receive the rear axle 3 which is of a similar angular cross section and is secured therein by bolts 4. Mounted on the ends of this axle are wheels 5. The outer ends of the wheel hubs are provided with caps 6 which provide a smooth round surface to contact with supporting platforms or the material with which the truck may come in contact and avoid gouging or injuring this material. The forward end of the base or frame 1 is provided with a forwardly and upwardly extending bracket 7, preferably in the form of a heavy casting rigidly secured to the base and forming a part thereof. This bracket is provided at its forward end with a vertical bearing 8 in which is journaled a stud 9 having rigidly secured thereto a bearing plate 10 on which the bearing 8 rests. This bearing plate is provided with depending arms 11 constituting a yoke and arranged to receive between them the front wheel 12 of the truck which is mounted on an axle 13 journaled in the arms 11. A cap plate 14 is rigidly secured to the stud 9, preferably by screws 15, and is provided with bearing lugs 16 to receive a pin 17 by means of which the yoke 18 of a handle 19 is pivotally connected both with the base of the truck and with the steering wheel 12. It should be noticed that the handle 19 is freely pivoted so that it can swing either to the left or to the right of the position shown in Fig. 1.

Mounted on the base 1 is a load-supporting platform 20 arranged for movement toward and away from the base. This movement is preferably in a substantially vertical line so that the load is lifted vertically and not at an inclination. To accomplish this we have interposed between the platform 20 and the base 1 a plurality of pairs of toggle joints 21, each toggle joint having its upper and lower ends pivotally connected, respectively, with the platform and the base. Each pair of toggle joints are preferably connected one to the other by rods 22 extending transversely to the truck and forming the intermediate pivots of both toggle joints of that pair. In this manner the toggle joints of each pair are tied firmly together and are caused to move exactly in unison, thereby preventing any wabbling or unevenness in the lifting of the load. To guide the platform in a vertical direction and maintain the same against lateral or longitudinal displacement we have provided the same with guides coöperating with parts of the base 1. As here shown a single guide 23 is provided at the rear end of the platform and is in the form of an angle iron riveted to the platform and having a vertical flange extending downward in contact with the rear wall of the base 1 for substantially its full width.

Each of the forward corners of the platform is provided with angular guides 24 engaging the respective corners of the base 1 and adapted to hold the platform against both lateral and rearward movement relatively thereto. As a result of these guides the straightening up of the toggle joints will cause the platform, and the load thereon, to be lifted in a vertical direction and when elevated the platform will be supported by the toggle joints. To this end the base is provided with vertical portions forming stops, as shown at 25 and 26, which are so arranged that they will be engaged by the intermediate portions of the respective toggle joints when the latter have been moved slightly past their fully elevated positions. Thus, the weight of the load will tend to bend the toggle joints in the direction of the stops and this tendency will be counteracted by the stops and the toggle joints retained in their extended positions. The stop 25 is formed from one of the faces of a channel bar, as clearly shown in Fig. 1. The forward pair of toggle joints operate within the channel thereof. The forward face of the channel bar acts as a guideway for the guide 24. The rear end of the base is formed of an angular bar, a portion of which is the stop 26. The rear toggle joints are pivoted to a horizontal portion of said angular bar, as shown, and the remaining vertical portion of said angular bar constitutes a guideway for the guide 23, as clearly shown in Fig. 1.

Suitable actuating devices are provided for manipulating the toggle joints to raise and lower the platform and these devices are such that they can be operatively connected with and disconnected from the pivoted handle, whereby this handle may be utilized as a lever to raise the load on the platform. In the present instance we have shown the actuating device as comprising two bell crank levers 27 pivotally mounted on a common axis on the opposite sides of the bracket 7 and to the rear of the pivot 17. The downwardly extending arms of these bell crank levers are connected by links 28 with the forward pair of toggle joints, and, in the present instance, the links are mounted on the rod 22 close to the joints. Thus, the movement of the bell crank levers about their axes will bend or straighten the forward pair of toggle joints and this movement, in a like manner, will be transmitted from the forward pair of toggle joints to the rear pair of toggle joints by means of connecting links or bars 29 connected with the respective toggle joints, and, in the present instance, mounted on the rods 22. The upper arms of the bell crank levers 27 extend forwardly and when the platform is in its lowermost position extend upwardly at a sharp angle to the vertical. Each arm is provided in its upper portion with a slot 30 open at its upper end. A connecting device, which is here shown in the form of a sleeve 31, is slidably mounted on the handle and is provided with laterally extending pins 32 adapted to be moved into and out of the slots 30 of the respective arms of the bell crank lever, thereby connecting the handle with and disconnecting the same from the actuating devices. To facilitate the movement of the sleeve it is provided with an upwardly extending portion 33 connected with the upper portion of the handle by a collar 34 and having a hand grip or finger piece 35 by means of which the connecting device may be manipulated to connect the handle with or disconnect the same from the connecting devices. Preferably, the truck handle is provided with a stop 36 to limit the upward movement of the connecting device. It will be apparent, therefore, that with the platform in its lowermost position the truck can be placed beneath the load which is to be lifted, which load is ordinarily supported on a bench-like base of a height just sufficient to permit the truck to be placed beneath the same, and the handle moved into a substantially vertical position and connected with the actuating devices.

The downward movement of the handle will actuate the bell crank levers and cause the platform and the load thereon to be lifted. Because of the length of the handle a powerful leverage is secured and a very heavy load may be lifted in this manner. The slotted connection between the handle and the actuating devices permits of the relative movement of the handle and the bell crank levers due to the different centers on which these parts are mounted. The preferred manner, however, of lifting the load is to swing the lever 19 to the left of the position shown in Fig. 1, the pins 32 being first removed from the slots 30 if located therein, and then sliding the sleeve 31 downwardly to engage the upper outside portion of the crank levers 27. The handle 19 is then given a downward swinging movement, thereby causing the crank levers 27 to elevate the load. By this method of raising the load the necessity of lifting the pins out of the fork before again lifting the handle 19 is obviated as shown in dotted lines on Fig. 1. The platform can be lowered if desired either by moving the pins 32 into the forked portion 30 or by having the pins bear against the lower outside portion of the crank levers 27 in the manner above described in connection with the raising of the platform. It is often a very handy way of keeping the handle out of the way and to prevent it from swinging back and forth to the right or to the left by placing the pins 32 in engagement with the forked openings 30, as shown in Fig. 1. It will be seen that by the construction comprising the pivoted crank levers 27, the handle pivoted directly to the base and located in front of the pivot of the crank levers, the handle being free to swing to the left or right and also having a sleeve movable axially thereof and located upon the outside thereof, said sleeve having projecting pins to engage the crank lever, a wide range of manipulation is obtained. It will further be noted that the sleeve 31 of the actuating device and that portion of the handle on which it is mounted are substantially circular in cross section, as shown in Fig. 2, thus permitting the truck to be steered when the handle is connected with the platform-actuating devices. Obviously, however, this sleeve may be angular in cross section, if desired, so that the handle will be held against rotary movement therein, and in Fig. 4, we have shown a modified form of the invention in which the sleeve 37 and the handle 38 are square in cross section.

The operation of the mechanism will be readily understood from the foregoing description thereof and we wish it to be understood that while we have shown and described one embodiment of the invention this has been chosen for the purposes of illustration only, and we do not desire to be limited to the details of construction shown and described, for obvious modifications will occur to a person skilled in the art.

Having thus fully described our invention, what we claim as new and desire to secure by Letters Patent, is:—

1. In a truck, a base comprising front and rear vertical surfaces, a vertically adjustable platform mounted above the base, an angle bar fixed by one flange to one end of the platform and engaging with the other flange one of the said vertical surfaces, thereby constituting a guide, and angular guides carried by the other end of said platform and extending downward to engage the other of said vertical surfaces and embracing the adjacent corners of the base, whereby said platform is directed in a vertical path.

2. In a truck, a base comprising an angular bar having vertical flanges, a platform mounted above said base, toggle joints mounted within said angular bar and connecting said base and platform, a guide plate on said platform, and the vertical flanges of said angular bar being arranged to act as a stop for the toggle joints and as a guideway for the guide plate.

3. In a truck, a base comprising front and rear vertical surfaces, a vertically adjustable platform mounted above said base, a vertical plate projecting downward from one end of said platform and extending across the same, said plate engaging one of said vertical surfaces, thereby constituting a guide, and angular guides carried by the other end of said platform, embracing the corners thereof and projecting downward, said guides engaging the other of said vertical surfaces and embracing the adjacent corners of the base, whereby said platform is directed in a vertical path.

4. In a truck, a base comprising vertical surfaces, a platform mounted on said base, toggle joints to move said platform vertically, guide plates mounted on said platform, said vertical surfaces coöperating with said guide plates and said toggle joints to constitute guideways and stops.

5. In a truck, a portable base, a handle pivoted to said base and free to swing to the front or rear from a position of rest, a platform mounted on said base, means including a lever for raising and lowering said platform, one end of said lever extending to a point adjacent said handle, means adjustably mounted on said handle for engaging and disengaging said lever, said lever and said handle being so arranged that the adjustable means can be moved to engage the outside of said lever to operate the same to elevate the platform when the handle is moved in one direction and to disengage from said lever by a simple movement of the handle in the other direction without further adjustment thereof.

6. In a truck, a portable base, a handle pivoted on said base, a vertically adjustable platform mounted on said base, means for adjusting said platform, said means comprising a pair of levers pivoted to the rear of the pivot of said handle and having ends extending forwardly adjacent the handle, said handle having a hand grip held against movement lengthwise thereof and a sleeve slidably mounted thereon, said levers and said handle being so arranged that said sleeve can be moved to engage the outside of said levers to operate the same to elevate the platform when the handle is moved in one direction and to disengage from said levers by a simple movement of the handle in the other direction without further adjustment thereof.

7. In a truck, a portable base, a handle pivoted to said base, said handle having a hand grip immovable lengthwise thereof, a vertically adjustable platform mounted on said base, toggle joints interposed between said platform and base for raising the same, levers pivoted to the rear of the pivot of said handle and having ends extending forwardly adjacent the handle, links connecting said levers to said toggles, and means adjustably mounted on said handle for engaging and disengaging said levers, said levers and said handle being so arranged that said adjustable means can be moved to engage the outside of said levers to operate the same to elevate the platform when the handle is moved in one direction and to disengage from said levers by a simple movement of the handle in the other direction without further adjustment thereof.

8. In a truck, a portable base, a handle connected with said base, said handle having a hand grip immovably mounted relatively thereto, a platform mounted on said base, devices to elevate said platform relatively to said base comprising a pair of levers pivotally connected with said base and having parts extending on opposite sides of said handle, a sleeve slidably mounted on said handle and having projections on the opposite sides thereof, said levers and said handle being so arranged that the said sleeve can be moved to engage the outside of the said levers to operate the same to elevate the platform when the handle is moved in one direction and to disengage from said levers by a simple movement of the handle in the other direction without further adjustment thereof.

9. In a truck, a portable base, a handle pivotally connected to said base, said handle having a hand grip immovably mounted relatively thereto, a platform mounted above said base, devices to elevate said platform relatively to said base, said devices comprising levers pivotally connected with the base and having parts extending on the opposite sides of said handle, a sleeve slidably mounted on said handle, said sleeve having projections adapted to engage said levers, means for adjusting said sleeve lengthwise of said handle, and slots in the ends of said levers adapted to receive the projections on said sleeve.

10. In a truck, a portable base, a handle pivoted to said base, said handle having a hand grip held against movement lengthwise thereof, a platform mounted on said base, lever mechanism to elevate said platform relatively to said base, an engaging device slidably mounted on the lower portion of said handle, said engaging device being arranged to engage and disengage said lever mechanism to elevate the platform, and a second hand grip slidably mounted on said handle at a point remote from said engaging device and operatively connected therewith.

11. In a truck, a portable base, a handle pivotally connected with said base, said handle having a hand grip held against movement lengthwise thereof, a platform mounted on said base, lever mechanism to elevate said platform relatively to said base, an engaging device slidably mounted on said handle and adapted to engage and disengage said lever mechanism, said handle and said engaging device being rotatable relatively to each other.

12. In a truck, a portable base, a steering wheel connected to the forward part of said base on a vertical axis, a handle connected with said steering wheel and adapted to be moved into a position in alinement with the axis thereof, a platform mounted on said base, devices to elevate said platform relatively to said base, said devices comprising a lever and a connecting device mounted on said handle to connect the same with and disconnect it from said lever, said handle being rotatable relatively to said connecting device, whereby when said handle is moved into alinement with the axis of said steering wheel said handle may be actuated to manipulate said steering wheel.

13. In a truck, a base having a transversely extending angle bar comprising horizontal and vertical portions, said portions forming an angular recess therebetween, an axle mounted in said recess, a platform mounted on said base, said platform having vertical guides thereon in engagement with a vertical portion of said angle bar, and means for raising said platform relatively to said base.

14. In a truck, a portable base having a transversely extending angle bar comprising horizontal and vertical portions, said portions being arranged to form an angular recess therebetween, an axle mounted in said recess, a platform mounted on said base, means comprising toggle joints for raising and lowering said platform, certain of said toggle joints being arranged adjacent to said angle bar, and a vertical portion of said angle bar being arranged to act as a stop to limit the movement of said toggle joints.

15. In a truck, a portable base, a handle pivoted to said base and free to swing to the front or rear from a position of rest, a platform mounted on said base, means including a lever for raising and lowering said platform, one end of said lever extending to a point adjacent said handle, means adjustably mounted on said handle for engaging and disengaging said lever, said lever and said handle being so arranged that said adjustable means can be moved to engage the outside of said lever to operate the same to elevate the platform when the handle is moved in one direction and to disengage from said lever by a simple movement of the handle in the other direction without further adjustment thereof, and means on said lever for holding said handle in a position of rest through the instrumentality of said adjustable means.

In testimony whereof, we affix our signatures in presence of two witnesses.

SHERWOOD M. CHASE.
FRANK A. FLEMING.

Witnesses:
J. C. McMillan,
Maud Van De Mark.